US012647422B2

(12) United States Patent
Aravamudhan et al.

(10) Patent No.: US 12,647,422 B2
(45) Date of Patent: Jun. 2, 2026

(54) SYSTEMS AND METHODS FOR RESTRICTING ACCESS TO TOKENIZATION SERVICES

(71) Applicant: JPMORGAN CHASE BANK, N.A., New York, NY (US)

(72) Inventors: Sridhar Aravamudhan, Middletown, DE (US); Howard Spector, Street, MD (US); Valli Musti, Scarsdale, NY (US); Valerii Dmytryk, Woodinville, WA (US); Bharat B Sharma, Glasgow (GB); Neha Srivastava, SeaTac, WA (US); Gunjeet Singh, San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 144 days.

(21) Appl. No.: 18/601,734

(22) Filed: Mar. 11, 2024

(65) Prior Publication Data

US 2025/0184328 A1 Jun. 5, 2025

Related U.S. Application Data

(63) Continuation-in-part of application No. 18/527,074, filed on Dec. 1, 2023.

(51) Int. Cl.
*H04L 9/40* (2022.01)
(52) U.S. Cl.
CPC .................................... *H04L 63/10* (2013.01)
(58) Field of Classification Search
CPC ...................................................... H04L 63/10
See application file for complete search history.

(56) References Cited

U.S. PATENT DOCUMENTS

| | | | | |
|---|---|---|---|---|
| 11,799,862 B2 * | 10/2023 | Kang | .................... | G06F 21/335 |
| 11,811,739 B2 * | 11/2023 | Fryer | .................. | H04L 63/0428 |
| 12,380,437 B1 * | 8/2025 | Burton | ................. | G06Q 20/385 |
| 2017/0111338 A1 * | 4/2017 | Malatesha | ........... | H04L 67/1097 |
| 2017/0201549 A1 | 7/2017 | Vincent et al. | | |
| 2019/0182230 A1 * | 6/2019 | Wong | .................. | H04W 12/068 |
| 2021/0084018 A1 * | 3/2021 | Stuntebeck | ........... | G06F 21/335 |
| 2021/0312433 A1 * | 10/2021 | Flurscheim | .......... | G06Q 20/385 |
| 2021/0320922 A1 | 10/2021 | Furhmann et al. | | |
| 2022/0353267 A1 | 11/2022 | Kundu et al. | | |
| 2025/0158989 A1 * | 5/2025 | Howe | .................... | H04L 63/20 |

* cited by examiner

*Primary Examiner* — Frantz B Jean
(74) *Attorney, Agent, or Firm* — GREENBERG TRAURIG LLP

(57) ABSTRACT

Systems and methods for restricting access to tokenization services are disclosed. A method may include: receiving, at a computer program in a public cloud and from a client application for a client executed by an electronic device, onboarding information; setting, by the computer program, entitlements for the client application or the client to access a plurality of services in the public cloud; receiving, by the computer program, a request to access one of the plurality of services in the public cloud from the client application; determining, by the computer program, that the client application or the client is entitled to access the service to execute the request based on the entitlements for the client application or the client; and granting, by the computer program, access to the service to execute the request; wherein the service is configured to execute the request and return data to the client application.

20 Claims, 5 Drawing Sheets

SYSTEMS AND METHODS FOR RESTRICTING ACCESS TO TOKENIZATION SERVICES

RELATED APPLICATIONS

This application is a Continuation-In-Part of U.S. patent application Ser. No. 18/527,074 filed Dec. 1, 2023, the disclosure of which is hereby incorporated, by reference, in its entirety.

BACKGROUND OF THE INVENTION

1. Field of the Invention

Embodiments relate to systems and methods for restricting access to tokenization services.

2. Description of the Related Art

A system may use public cloud technology to deliver core critical business services to customers and stakeholders. In some cases, the system may need to distribute sensitive data across internal and/or external applications. Distributing sensitive data on the public cloud, however, increases the risk of inappropriate access/theft to that sensitive data.

SUMMARY OF THE INVENTION

Systems and methods for restricting access to tokenization services are disclosed. According to one embodiment, a method may include: (1) receiving, at a computer program in a public cloud and from a client application for a client executed by an electronic device, onboarding information; (2) setting, by the computer program, entitlements for the client application or the client to access a plurality of services in the public cloud; (3) receiving, by the computer program, a request to access one of the plurality of services in the public cloud from the client application; (4) determining, by the computer program, that the client application or the client is entitled to access the service to execute the request based on the entitlements for the client application or the client; and (5) granting, by the computer program, access to the service to execute the request; wherein the service is configured to execute the request and return data to the client application.

In one embodiment, the entitlements are stored in an entitlements database.

In one embodiment, the service may include a tokenization service.

In one embodiment, the request may be a request to tokenize source data.

In one embodiment, the source data may include a primary account number for a credit card or a debit card.

In one embodiment, the services may include a token lookup service. The request may include a token lookup for source data.

In one embodiment, the source data may include a primary account number for a credit card or a debit card.

In one embodiment, the method may also include denying, by the computer program, the request in response to the client application or the client not being entitled to access the service.

According to another embodiment, a system may include: a client electronic device executing a client application that is associated with a client; an entitlements database; and a public cloud comprising a computer program and a plurality of services, wherein the computer program may be configured to receive onboarding information for the client application or the client from the client electronic device; to set entitlements for the client application or the client to the plurality of services in the public cloud; to store the entitlements in the entitlements database; to receive a request to access one of the plurality of services from the client application; to determine that the client application or the client is entitled to access the service to execute the request based on the entitlements for the client application or the client; and to grant access to the service to execute the request; and the service may be configured to execute the request and return data to the client application.

In one embodiment, the service may include a tokenization service.

In one embodiment, the request may be a request to tokenize source data.

In one embodiment, the source data may include a primary account number for a credit card or a debit card.

In one embodiment, the service may include a token lookup service. The request may include a token lookup for source data.

In one embodiment, the source data may include a primary account number for a credit card or a debit card.

In one embodiment, the computer program may be further configured to deny the request in response to the client application or the client not being entitled to access the service.

According to another embodiment, a method may include: (1) receiving, at a computer program in a public cloud and from a client application for a client executed by an electronic device, onboarding information; (2) setting, by the computer program, entitlements for the client application or the client to access a plurality of services in the public cloud; (3) receiving, by the computer program, a request to access a first of the plurality of services in the public cloud from the client application; (4) determining, by the computer program, that the client application or the client is not entitled to access the first service to execute the request based on the entitlements for the client application or the client; (5) denying, by the computer program, the request to access the first service; (6) determining, by the computer program, that the client application or the client is entitled to access a second service to execute the request based on the entitlements for the client application or the client; and (7) granting, by the computer program, access to the second service to execute the request; wherein the second service is configured to execute the request and return data to the client application.

In one embodiment, the first service may include a tokenization service and the second service may include a token lookup service.

In one embodiment, the request may be a request to tokenize source data, and the second service returns a token for the source data.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for restricting access to tokenization services.

Embodiments may provide separate end points for tokenization services and token lookup services, thereby preventing unauthorized entities or applications from requesting tokenization of primary account numbers (PANs). Thus, only one token may be generated for a PAN, thereby reducing or eliminating interoperability issues in using tokens in place of PANs. This token may be propagated to both downstream and upstream applications to facilitate data correlation.

Embodiments may provide a separate endpoint for token lookup, wherein an authorized entity or application may retrieve a token for a PAN.

In one embodiment, the authorizations or entitlements for the entities or applications may be set during onboarding.

The tokens may be used to tokenize sensitive data (e.g., source data) before moving it onto the public cloud. For example, tokens, such as random tokens, may be used in place of the sensitive data, thereby providing useful information to external parties without exposing sensitive data. In embodiments, the tokens cannot be calculated back to their original values, thereby allowing for better protection of sensitive data.

Embodiments may generate tokens that may be idempotent within a logical boundary that represents a type of data. This logical boundary may be referred to as a "namespace." Each namespace may be protected using its own tokenization and de-tokenization entitlement, where permissions to a namespace may be managed by data owners. The use of namespaces provides for multitenancy.

In embodiments, the risk of data breaches or theft may be significantly reduced by using a token to protect sensitive data, such as credit card information.

Figure 1:
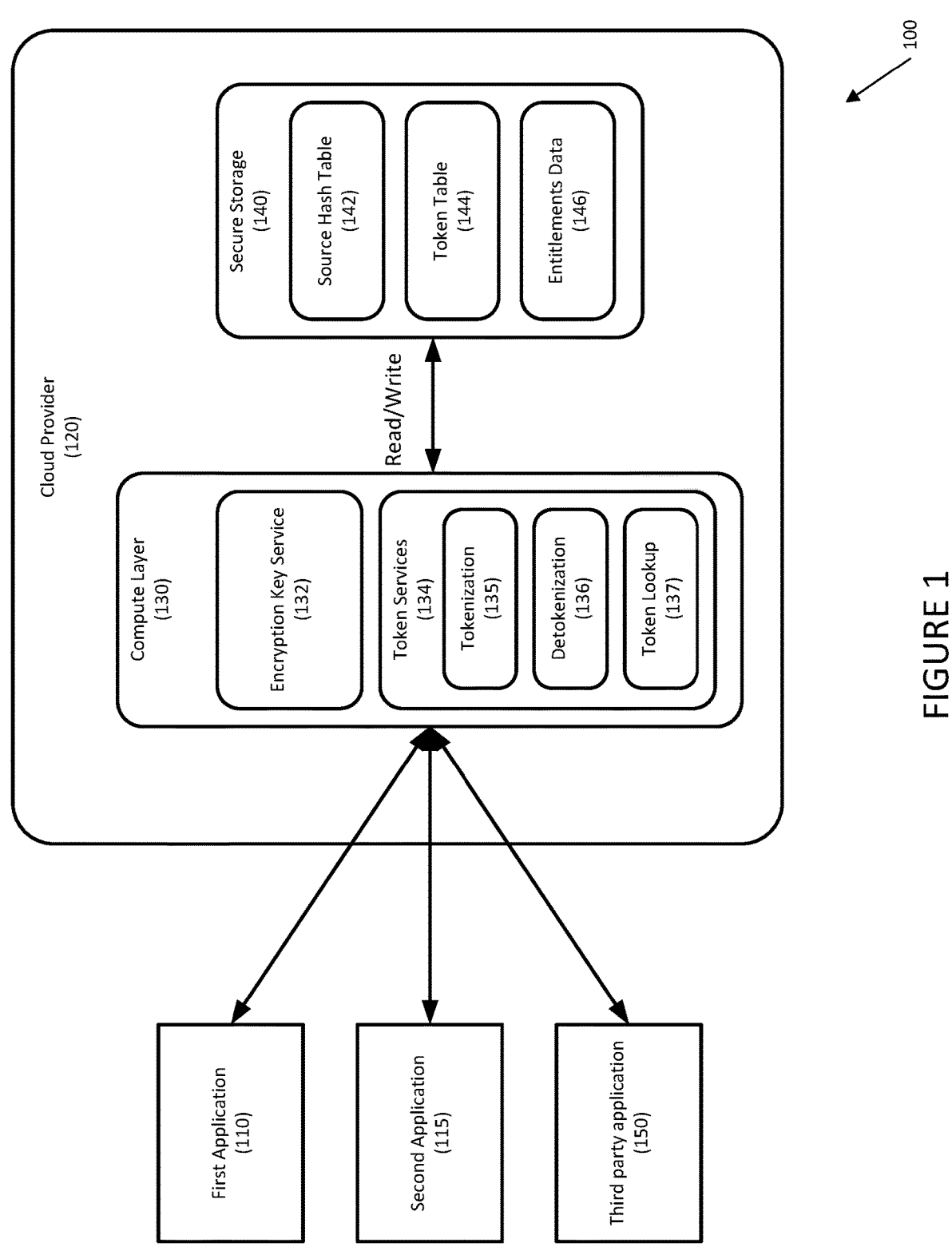
FIG. 1 illustrates a system for restricting access to tokenization services according to an embodiment.

Referring to FIG. 1, a system for prefetching PCI data is disclosed according to an embodiment. System 100 may include first application 110 and second application 115, which may be computer programs or applications executed by a client electronic device (not shown), such as a server (e.g., physical and/or cloud-based), a computer (e.g., a workstation, a desktop, a laptop, a notebook, a tablet, etc.), a smart device (e.g., a smart phone, a smart watch, etc.), an Internet of Things (IoT) appliance, etc.

First application 110 and second application 115 may interface with cloud provider 120, which may provide a public cloud. In one embodiment, first application 110 and second application 115 may onboard or register with cloud provider 120 and may have their entitlements or permissions saved in entitlements data 146. The entitlements or permissions may indicate whether first application 110 and second application 115 are authorized to access services provided by tokenization service 135, such as tokenization service 135, detokenization service 136, and token lookup service 137, and what level of access is allowed (e.g., read only, write only, or read/write).

Third party 150 may also register with cloud provider 120 and may have its entitlements saved in entitlements data 146 as well.

Compute layer 130 may include encryption key service 132, which may maintain encryption keys, and token services 134. Token services 134 include tokenization service 135 that may tokenize source data, detokenization service 136 that may return source data for a token, and token lookup service 137 that may determine if there is a token for source data and may return the token if one is available.

Token services 134 may expose an application programming interface (API) interface that may be accessed by first application 110, second application 115, third party application 150, etc. Token services 134 retrieve the entitlements for the requestor from entitlements data 146. Based on the entitlements, token services 134 may grant or deny access to tokenization service 135, detokenization service 136, or token lookup service 137. The access may be read/write access, read only access, or write only access depending on the entitlements for the requestor.

Examples of tokenization services and token look-up services are disclosed in U.S. patent application Ser. No. 18/527,074 filed Dec. 1, 2023, the disclosure of which is hereby incorporated, by reference, in its entirety.

Secure storage 140 may include source hash table 142, token table 144, and entitlements data 146. Tokenization service 135 may receive source data in namespaces from the client application. It may generate a token for the source data in each namespace, and may encrypt the data using keys obtained from encryption key service 132.

Tokenization service 135 may also generate a hash (e.g., SHA-512) of the source data. Tokenization service 135 may persist the hash of the source data in source hash table 142 of secure storage 140 with the token. In one embodiment, source hash table 142 may support look-up operations, such by using a hash of the source data.

Figure 2:
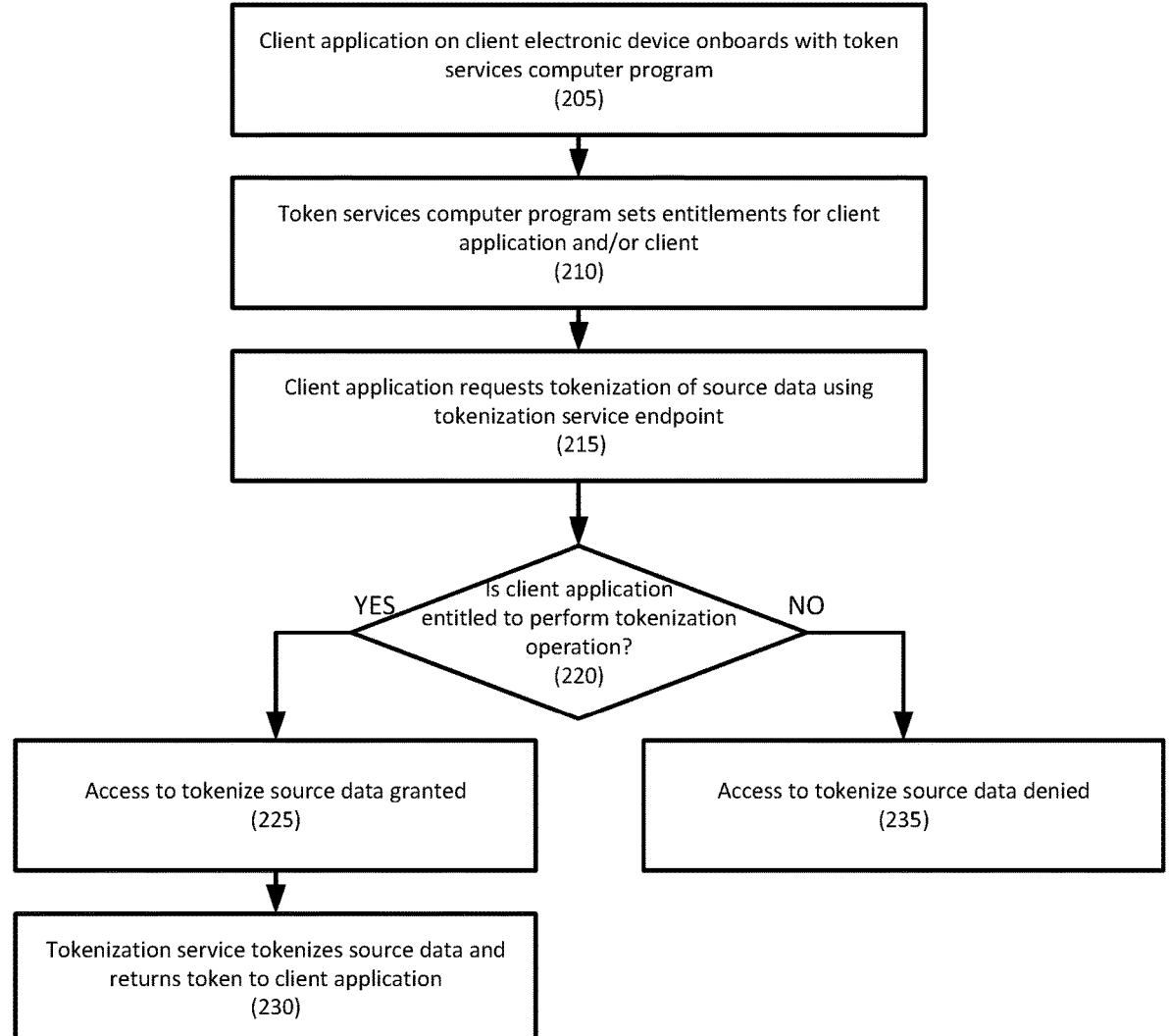
FIG. 2 illustrates a method for restricting access to tokenization services according to an embodiment.

Referring to FIG. 2, a method for tokenizing data in the public cloud is disclosed according to an embodiment.

In step 205, a computer application, such as a client application executed by a client electronic device, a third-party application executed by a third-party electronic device, etc. may onboard with a token services computer program provided by a cloud provider. In one embodiment, the token services computer program may receive the computer application's entitlements or permissions.

In step 210, the token services computer program may set the entitlements or permissions and may store them in an entitlements database.

In step 215, the computer application may request tokenization of source data by a tokenization service endpoint via the token services computer program. For example, the source data may be provided in forms in an electronic document. As another example, the source data may be received from a database.

In one embodiment, the source data may be received via a REST API interface as part of the request body. The body may include the namespace under which the requested source data needs to be tokenized.

In one embodiment, the source data may include sensitive data, personal identifiable data, etc.

The token services computer program may retrieve the entitlements or permissions for the computer application and/or the client/third party.

If, in step 220, the client/third party or the computer application is entitled to perform tokenization operations, in step 225, the token services computer program may grant access to tokenize the source data. In step 230, the tokenization service may tokenize the source data and may return the token to the client application.

Examples of a tokenization process are disclosed in U.S. patent application Ser. No. 18/527,074 filed Dec. 1, 2023, the disclosure of which is hereby incorporated, by reference, in its entirety.

If, in step 220, the client or client application is not entitled to perform tokenization operations, in step 235, the token services computer program may deny access to tokenize the source data.

Figure 3:
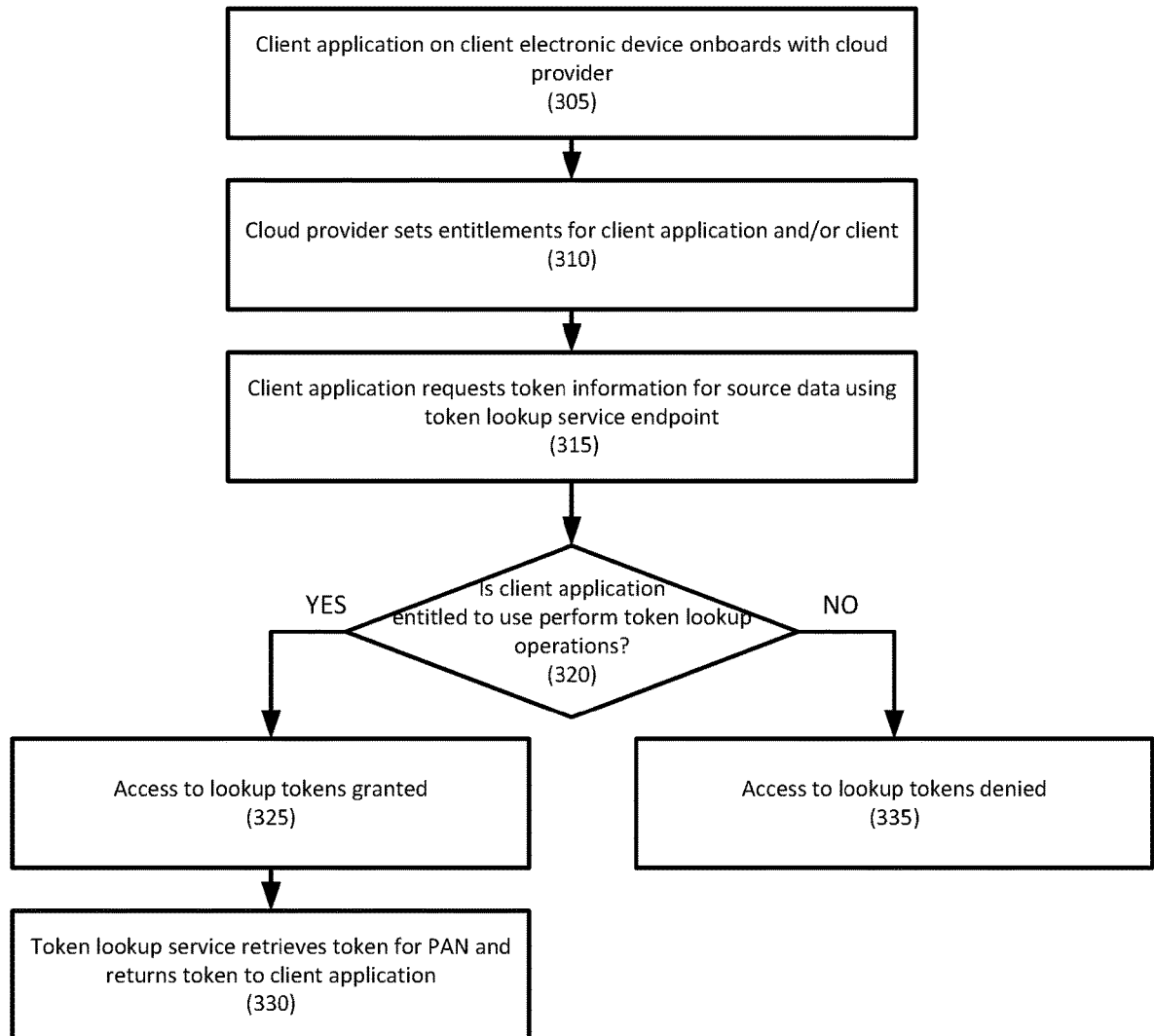
FIG. 3 illustrates a method for token lookup in the public cloud according to another embodiment.

FIG. 3 illustrates a method for token lookup in the public cloud according to another embodiment.

In step 305, a computer program, such as a client application executed by a client electronic device, may onboard with a cloud provider. In one embodiment, the cloud provider may receive the client application's entitlements or permissions.

In step 310, the cloud provider may set the entitlements or permissions and may store them in an entitlements database.

In step 315, the client application may request token-lookup for source data to a token lookup service endpoint. For example, the source data may be provided in forms in an electronic document. As another example, the source data may be received from a database.

In one embodiment, the source data may be received via a REST API interface as part of the request body. The body may include the namespace under which the requested source data needs to be tokenized.

In one embodiment, the source data may include sensitive data, personal identifiable data, etc.

The token lookup service endpoint may retrieve the entitlements or permissions for the client application and/or the client.

If, in step 320, the client or client application is not entitled to perform token lookup operations, in step 335, the cloud provider may deny access to the token lookup service.

If, in step 320, the client or client application is entitled to perform token lookup operations, in step 325, the cloud provider may grant access to the token lookup service. In step 330, the token lookup service may retrieve the token for the source data and may return the token to the client application.

Figure 4:
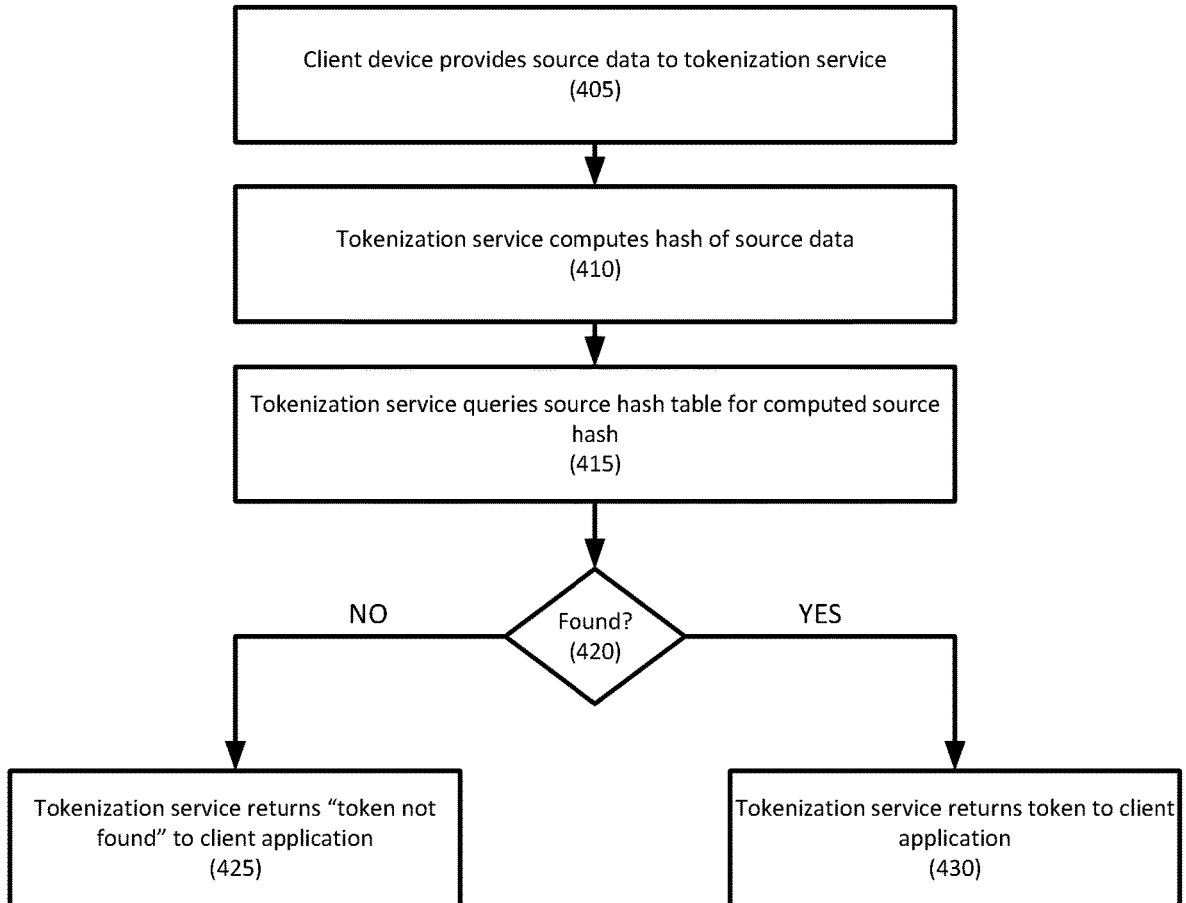
FIG. 4 depicts a method for token lookup in the public cloud according to an embodiment.

An example of a token lookup process is provided in FIG. 4.

In step 405, the client application may provide the source data to a tokenization service in a compute layer of public cloud. In one embodiment, the client application may also provide an application identifier and the namespace.

In step 410, the tokenization service may compute a hash of the source data. In one embodiment, the tokenization service may hash the source data using the process for the namespace.

In one embodiment, the tokenization service may hash an application identifier if provided.

In step 415, the tokenization service may query the source hash table for the computed source hash.

In one embodiment, the tokenization service may validate that the client is entitled or permissioned to access the source data.

In one embodiment, the tokenization service may perform an authorization check for each item in the client request. For example, the tokenization service may check that a record exists in the metadata table for the requested combination of the application identifier and namespace, and that a corresponding entitlement for this combination is provided in the authentication token received with the request.

If, in step 420, the query returns no results, in step 425, the tokenization service may output a "token not found" response to the client application.

If, in step 420, the query returns a token, in step 430, the tokenization service may return the token to the client application. The token may then be used as a proxy for the source data.

If access to a first service such as a tokenization service, is denied, embodiments may provide access to a second service, such as a token lookup service, if the client is entitled to such access. In another embodiment, the second service may be a service that does not require entitlements.

Figure 5:
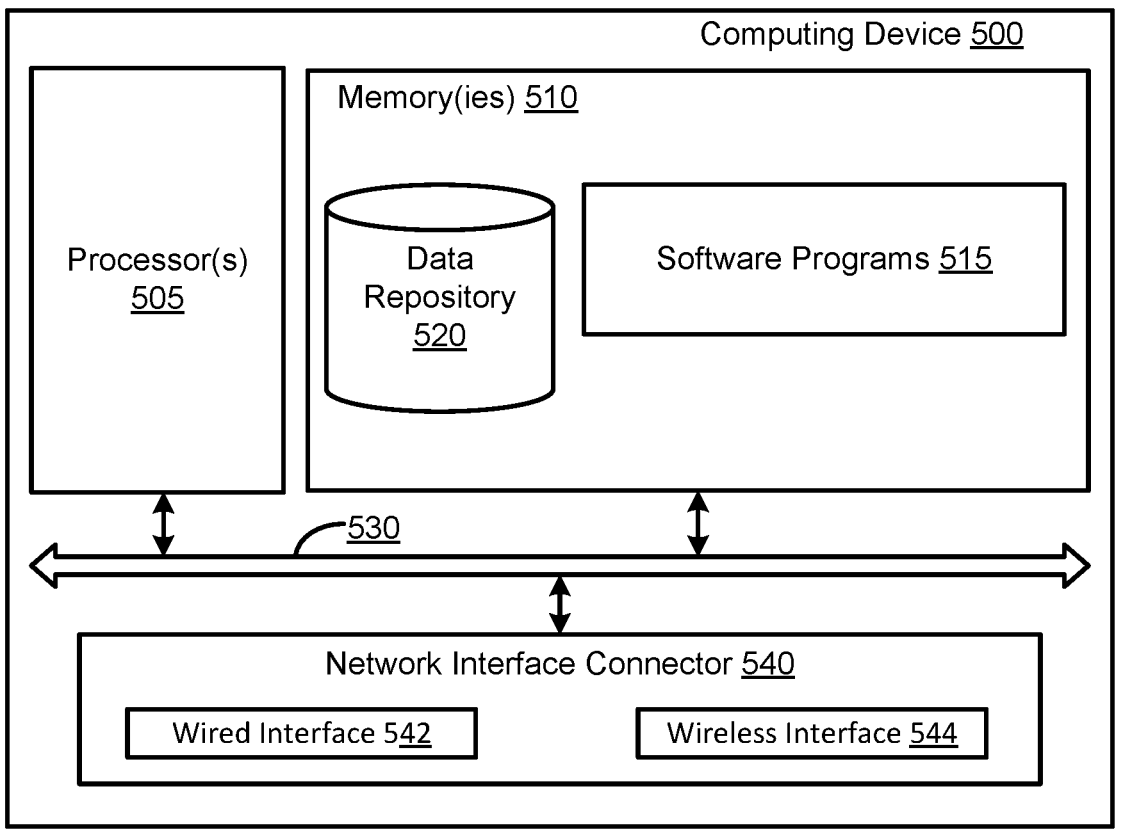
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

The disclosure of U.S. patent application Ser. No. 18/527,074, filed Dec. 1, 2023, is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer.

However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
receiving, at a computer program in a public cloud and from a client application for a client executed by an electronic device, onboarding information;
receiving, by the computer program, entitlements for the computer application or the client to access a plurality of services in the public cloud;
setting, by the computer program, the entitlements for the client application or the client to access the plurality of services to secure storage in the public cloud;
receiving, by the computer program, a request to access one of the plurality of services in the public cloud from the client application;
determining, by the computer program, that the client application or the client is entitled to access the service to execute the request based on the entitlements for the client application or the client; and
granting, by the computer program, access to the service to execute the request;
wherein the service is configured to execute the request and return data to the client application.

2. The method of claim 1, wherein the entitlements are stored in an entitlements database in the secure storage.

3. The method of claim 1, wherein the service comprises a tokenization service.

4. The method of claim 3, wherein the request is a request to tokenize source data.

5. The method of claim 4, wherein the source data comprises a primary account number for a credit card or a debit card.

6. The method of claim 1, wherein the service comprises a token lookup service.

7. The method of claim 6, wherein the request comprises a token lookup for source data.

8. The method of claim 7, wherein the source data comprises a primary account number for a credit card or a debit card.

9. The method of claim 1, further comprising:
denying, by the computer program, the request in response to the client application or the client not being entitled to access the service.

10. A system, comprising:
a client electronic device executing a client application that is associated with a client; and
a public cloud comprising an entitlements database, a computer program, and a plurality of services, wherein the computer program is configured to receive onboarding information for the client application or the client from the client electronic device; to receive entitlements for the computer application or the client to access the plurality of services in the public cloud; to set the entitlements for the client application or the client to the plurality of services in the public cloud to the entitlements database; to store the entitlements in the entitlements database; to receive a request to access one of the plurality of services from the client application; to determine that the client application or the client is entitled to access the service to execute the request based on the entitlements for the client application or the client; and to grant access to the service to execute the request;
wherein the service is configured to execute the request and return data to the client application.

11. The system of claim 10, wherein the service comprises a tokenization service.

12. The system of claim 11, wherein the request is a request to tokenize source data.

13. The system of claim 12, wherein the source data comprises a primary account number for a credit card or a debit card.

14. The system of claim 10, wherein the service comprises a token lookup service.

15. The system of claim 14, wherein the request comprises a token lookup for source data.

16. The system of claim 15, wherein the source data comprises a primary account number for a credit card or a debit card.

17. The system of claim 10, wherein the computer program is further configured to deny the request in response to the client application or the client not being entitled to access the service.

18. A method, comprising:
receiving, at a computer program in a public cloud and from a client application for a client executed by an electronic device, onboarding information;
receiving, by the computer program, entitlements for the computer application or the client to access a plurality of services in the public cloud;

setting, by the computer program, the entitlements for the client application or the client to access the plurality of services to secure storage in the public cloud;

receiving, by the computer program, a request to access a first of the plurality of services in the public cloud from the client application;

determining, by the computer program, that the client application or the client is not entitled to access the first service to execute the request based on the entitlements for the client application or the client;

denying, by the computer program, the request to access the first service;

determining, by the computer program, that the client application or the client is entitled to access a second service to execute the request based on the entitlements for the client application or the client; and granting, by the computer program, access to the second service to execute the request;

wherein the second service is configured to execute the request and return data to the client application.

19. The method of claim 18, wherein the first service comprises a tokenization service and the second service comprises a token lookup service.

20. The method of claim 19, wherein the request is a request to tokenize source data, and the second service returns a token for the source data.

\* \* \* \* \*